United States Patent [19]

Liu

[11] 4,141,043
[45] Feb. 20, 1979

[54] PICTURE SIGNAL GENERATOR WITH LIGHT LEVEL CONTROL

[75] Inventor: Thomas P. L. Liu, Liverpool, N.Y.

[73] Assignee: General Electric Company, Syracuse, N.Y.

[21] Appl. No.: 788,268

[22] Filed: Apr. 18, 1977

[51] Int. Cl.² ............................................. H04N 5/19
[52] U.S. Cl. ..................................... 358/219; 358/228
[58] Field of Search ................................ 358/219, 228

[56] References Cited

U.S. PATENT DOCUMENTS 4,050,085  9/1977  Prince et al. ..................... 358/219

Primary Examiner—Richard Murray

[57] ABSTRACT

A picture signal generator includes a fast-acting servo loop responsive to changes in video output level to adjust image tube photocathode-to-storage-target accelerating voltage to maintain desired video output level, and a slow-acting servo loop responsive to the output of a portion of the fast-acting servo loop for adjusting input light level to the photocathode for optimum image tube operation.

2 Claims, 1 Drawing Figure

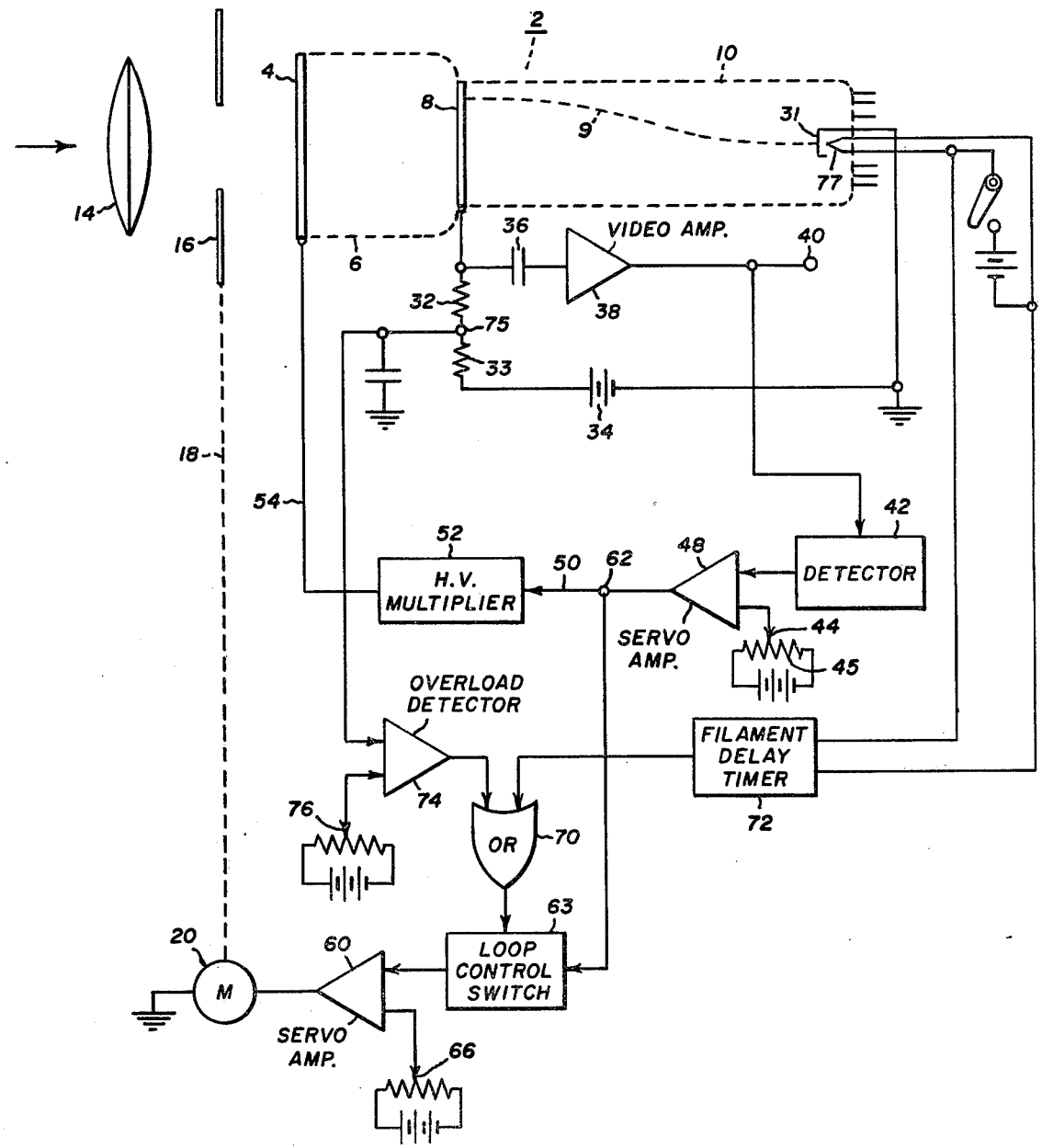

PICTURE SIGNAL GENERATOR WITH LIGHT LEVEL CONTROL

BACKGROUND OF THE INVENTION

The present invention relates to improvements in electronic cameras, or picture signal generating apparatus, of the type having an image tube including a photocathode for receiving incident image-conveying radiation, and a charge storage target such as the silicon target of a silicon target vidicon for storing an image-representing charge pattern on the target. More particularly, the invention relates to such apparatus having improved means for compensating for excessive variations in incident radiation intensity, by providing monitoring and control of the intensity of the image-conveying radiation arriving at the photocathode, coordinated with monitoring and control of the degree of acceleration of photoelectrons between the photocathode and target.

The invention contemplates that the image-conveying radiation incident at the photocathode may be of various kinds, such as visible light, infra-red radiation, X-rays, ultraviolet, and the like, and the efficacy of the invention is not limited to any particular wavelength or class of such image-conveying radiation, to all of which radiation, for simplicity, the term "light" will hereinafter be generically applied. The invention has particular utility in applications where the light level of the scene being viewed by the camera is subject to wide variations in intensity, such as from bright to dark night.

One of the problems which the present invention provides a particularly effective solution for is temporary or permanent reduction in the sensitivity of the image tube when the scene light level suddenly increases. This problem can take various forms. For example, excessive light impinging on the photocathode can cause excessive photo-emission which in turn can cause contamination of the photocathode by ionized residual gas within the intensifier section. The excessive photoelectron flow may also cause permanent degradation of the elements of the image tube. Another problem at high light levels is that corrective reduction of photoelectron accelerating voltage can cause nonuniformity in sensitivity over the image area of the photocathode which in turn reduces picture quality.

To attempt to minimize the possiblity of such undesired results, various techniques have heretofore been used, such as an arrangement to automatically introduce an incident light intensity-limiting filter, such as a neutral-density filter, into shielding or attenuating relation to the photocathode when the incident light intensity exceeds a predetermined level. Other prior art forms of such protective attempts have involved automatic control of an incident light transmitting aperture or iris in the incident light path to the photocathode. However, such prior art protective arrangements have the disadvantage of requiring light intensity sensor means ahead of, i.e. external to, the image tube, an arrangement which is not only relatively expensive but even more importantly interferes with and degrades the operating characteristics of the image tube. Also, such external sensor arrangements do not have the capability which the present invention has of optimizing the level of the incident light relative to the requirements of the photocathode, for a given scene viewed by the camera.

Accordingly, a principal object of the present invention is to provide improved means, in picture signal generating apparatus of the character hereinabove described, for protecting against excessive incident light levels without diminishing output picture quality throughout the designed light level operating range of the image tube.

another object is to provide an improved light intensity variation compensating means for image tubes of the character described, including coordinated control of both photocathode incident light and intensifier photoelectron acceleration.

Another object is to provide image tube control means of the character described which does not require light sensors other than the image tube itself, and which enables the full operating range of the image tube to be utilized while preserving picture quality and avoiding damage to the image tube throughout such range.

These and other objects of the present invention will be apparent from the following description together with the accompanying drawing.

In the drawing,

FIG. 1 is a schematic diagram of one form of picture signal generating apparatus including one form of image tube to which the present invention is applicable, and associated control means constructed in accordance with my invention.

With reference to FIG. 1, there is shown an image tube 2 including a conventional photocathode 4, a conventional photoelectron accelerating and focusing image intensifier 6, the photoelectrons passing through which are, as is well understood in the art, intercepted and stored as an image-representative charge pattern at a target 8 of silicon or other suitable charge storage material which is scanned for image readout purposes by the electron beam 9 of a conventional vidicon section 10. The image-conveying light directed toward photocathode 4 passes through a lens system 14 which may be of any conventional design and forms no part of the present invention, and thence through a light intensity control means 16 which may, for example, by any suitable type of intensity attenuator such as an adjustable aperture iris, the aperture size of which is adjusted by a mechanical linkage 18 of any suitable type activated by a drive motor 20.

Light passing through control means 16 falls on the photocathode 4 where, as is well understood in the art, photoelectrons are thereby produced. The photoelectrons are accelerated and focused to incidence on the target 8 of the vidicon section 10 by an electrostatic accelerating field established between the target 8 and photocathode 4, the photocathode 4 being maintained, as will be more fully hereinafter described, at a voltage of desired magnitude below the voltage of the target 8.

The charge pattern formed on the target 8 by the incident photoelectrons is read out by scanning the target 8 with electron beam 9 from cathode 31 of the vidicon in accordance with conventional vidicon operation well known to those skilled in the art. The resulting video output is recovered from resistor 32, which is in series with resistor 33 and vidicon power supply 34. Through capacitor 36 the read out video signal from target 8 is supplied to a conventional video amplifier 38, and the amplified output is fed to the video signal output terminal 40.

In accordance with the invention a fast-acting servo loop is provided to increase or decrease, respectively the photocathode-to-target photoelectron accelerating voltage of the intensifier 6, responsive to the average video signal output at 40. To accomplish this, the video output signal at terminal 40 is rectified in a detector 42 and compared with a manually adjustable reference DC voltage supplied to terminal 44 from potentiometer 45. The resulting differential voltage, i.e. the differential voltage by which the voltage output of detector 42 differs from the reference at terminal 44, is supplied through servo amplifier 48, which may be of any suitable conventional type, and lead 50 to high voltage multiplier 52. The output of high voltage multiplier 52 is in turn supplied through lead 54 to a photocathode 4 and determines the magnitude of the photoelectron accelerating voltage between the photocathode and target 8. Thus, the elements 42, 48, 52, 4, 8, 32, 36, and 38 form a servo loop which, when the amplified and detected video output from target 8 is higher than desired, signifying an excessive light intensity falling on the photocathode 4, acts quickly to reduce the photoelectron accelerating photocathode-to-target voltage, and when the output from target 8 is lower than desired acts to increase the photoelectron accelerating voltage. This in turn modifies the intensifier gain so as to keep the video output at terminal 40 substantially constant.

Cooperating, in accordance with my invention, with the fast-acting servo loop is a second slower-acting servo loop which includes all of the fast acting servo loop except multiplier 52, plus loop control switch 63, a servo amplifier 60, servo motor 20 and light control mechanism 16. Servo amplifier 60 responds to the differential of the voltage supplied from terminal 62 at the output of servo amplifier 48, compared with a manually-adjustable reference DC voltage at terminal 66. The voltage at terminal 62 is supplied to amplifier 60 through a loop control switch 63 whose function will be presently described. The reference voltage at terminal 66 is made manually adjustable to facilitate predetermined operation of photocathode 4 at a desired incident light intensity level.

The error signal constituted by the difference between the voltage at terminal 62 and the reference voltage at terminal 66 is amplified in servo amplifier 60 and drives the light intensity control 16 in the necessary direction to reduce the error signal to zero and thereby restore the intensity of light incident on the photocathode 4 to the desired value, in accordance with the voltage setting at terminal 66. Thus the second servo loop operates to maintain the input light level incident on photocathode 4 at the desired value for optimum image tube performance.

Loop control switch 63 serves merely to provide added protection of the image tube by insuring that the light intensity control 16 will be closed in the event of abnormalities in the operation of the image tube such as either excessive video output as measured at terminal 75, or inadequate heating of the filament of cathode 31 during initial power turn-on. Loop control switch 63 is a normally closed switch of any suitable design such as a transistor, and is actuated to block the signal from 62 by an OR gate 70 having inputs from either the filament delay timer 72 or the overload detector 74. The detector 74 is a difference amplifier which compares the voltage drop across resistor 33, due to photoelectron current at terminal 75, with a manually adjustable overload reference voltage at terminal 76, and upon the former exceeding the latter causes loop control switch 63 through OR gate 70 to open the loop. Thus, responsive to a signal from either the filament delay means 72, signifying that the filament heater 77 for cathode 31 has not been energized long enough for the vidicon section 10 to be operational, or responsive to a signal from the overload detector 74 signifying that excessive photoelectrons have fallen on target 8, the resulting output of OR gate 70 causes the opening of loop control switch 63 and thereby produces a large error signal at the output of servo amplifier 60 which closes the light control 16. Loop control switch 63 also incidentally serves to prevent system lock-up due to sudden excessive light input which might cause undesired inversion of the tube operating characteristic (light input vs signal current).

Thus, it may be seen that in the event of a fast-changing light level the fast-acting servo loop responds quickly to maintain the desired video level at terminal 40. However, the change of the photoelectron accelerating voltage by the action of the first servo loop, from its optimum design accelerating voltage level, undesirably degrades the picture quality performance of the image tube, and also increases the chance of photocathode or target damage if the voltage change is maintained for a long time. To avoid this, the cooperative action of the second servo loop, though somewhat slower, produces a response of the light intensity control means 16 in a direction to restore the light level incident on photocathode 4 to the desired value, thereby to alleviate the condition to which the first servo loop responded. This in turn produces a fresh error signal at terminal 62 to which the first servo loop responds to maintain the desired video level at terminal 40. The two loops thus continually and simultaneously readjust until both loops are satisfied. This enables the first servo loop to reestablish the predetermined desired photoelectron accelerating voltage between the photocathode 4 and target 8 so as to maintain the desired electrical operating conditions of the image tube for optimum image tube performance.

By this approach, not only is light overload or underload swiftly responded to and the image tube protected before damage can be caused, but as a consequence the image tube light level operating range is effectively extended. Additionally, it will be appreciated that if the light input becomes excessively low so that even with the light control means 16 in a wide-open condition the desired signal current and photocathode minimums of the image tube are not met, then the first servo loop will automatically cause the photoelectron accelerating voltage of intensifier 6 to become increasingly negative to target 8 and thereby increase the photoelectron acceleration and resultant sensitivity and low light level range of the image tube.

From the foregoing it will be evident that the essence of my invention is to provide cooperative fastacting and slower acting response means whose cooperation results not only in swift protection but also balanced extended protection which facilitates the electrical operation of the image tube at desired predetermined voltage levels consistent with its design characteristics, so as to enhance the performance, extend the range, and prolong the life of the image tube.

While I have shown and described a particular embodiment of my invention, it will be obvious to those skilled in the art that various changes and modifications may be made without departing from my invention in its broader aspects and I, therefore, aim in the appended claims to cover all such changes and modifications as falls within the true spirit and scope of my invention.

What is claimed is:

1. In picture signal generating apparatus including an image tube having a photocathode for receiving incident image-conveying radiation and a storage target for storing an image-representing charge pattern and an image intensifier section for accelerating photoelectrons from the photocathode to a focused image-representing charge pattern on the target, and means for deriving a video signal from the target, the improvement comprising fast-acting servo means including first error signal generating means for continuously deriving a first error signal from the difference between the average video output voltage and a first adjustable reference voltage, accelerating voltage modifying means responsive to said first error signal for modifying the photocathode-to-target photoelectron accelerating voltage in a direction to maintain the average video output voltage at a desired level relative to said first adjustable reference voltage, slow-acting servo means including second error signal generating means for continuously deriving a second error signal from the difference between said first error signal and a second adjustable reference voltage, and incident light intensity-modifying means continuously responsive to said second error signal for modifying the intensity of light incident on said photocathode in a direction such as to reduce the magnitude of said first error signal, whereby the operation of the slow-acting servo means minimizes the condition to which the fast-acting servo means respons.

2. Improved picture signal generating apparatus as defined in claim 1 wherein one of said servo means includes switch means responsive to abnormal operation of the image tube to reduce the incident light level on the photocathode.

* * * * *

UNITED STATES PATENT OFFICE
CERTIFICATE OF CORRECTION

PATENT NO. : 4,141,043
DATED : February 20, 1979
INVENTOR(S) : Thomas P. L. Liu

It is certified that error appears in the above-identified patent and that said Letters Patent are hereby corrected as shown below:

Column 2, line 40, change "by" to --be--

Column 4, line 53, change "fastacting" to -- fast-acting --

IN THE CLAIMS:

Claim 1, column 6, line 13, change "respons." to -- responds. --

Signed and Sealed this

Eighteenth Day of September 1979

[SEAL]

Attest:

LUTRELLE F. PARKER
Attesting Officer   Acting Commissioner of Patents and Trademarks